(12) United States Patent
Omstead

(10) Patent No.: US 7,300,061 B1
(45) Date of Patent: Nov. 27, 2007

(54) SULKY FOR SELF-PROPELLED MACHINES

(76) Inventor: Michael J. Omstead, 1415 W. Maximilian Pl., Tucson, AZ (US) 85704

( * ) Notice: Subject to any disclaimer, the term of this patent is extended or adjusted under 35 U.S.C. 154(b) by 146 days.

(21) Appl. No.: 11/145,691

(22) Filed: Jun. 6, 2005

(51) Int. Cl.
*B62D 63/00* (2006.01)

(52) U.S. Cl. ..................... 280/32.7; 280/400

(58) Field of Classification Search ............. 280/32.7, 280/78, 166, 494, 63, 492, 493, 498, 489, 280/400, 479.3; 172/433, 257, 329
See application file for complete search history.

(56) References Cited

U.S. PATENT DOCUMENTS

| | | | |
|---|---|---|---|
| 797,534 A * | 8/1905 | Pore ........................... | 172/332 |
| 2,503,696 A | 4/1950 | Weber et al. | |
| 2,660,447 A | 11/1953 | Bear | |
| 2,676,032 A | 4/1954 | Stegeman | |
| 2,740,462 A | 4/1956 | Stegeman | |
| 4,861,058 A * | 8/1989 | Cresswell ................... | 280/278 |
| 5,004,251 A | 4/1991 | Velke et al. | |
| 5,033,564 A * | 7/1991 | Mattson ...................... | 180/11 |
| 5,118,123 A * | 6/1992 | Betrock ...................... | 280/32.7 |
| 5,388,850 A * | 2/1995 | Simone ...................... | 280/442 |
| 5,564,721 A | 10/1996 | Wians | |
| 5,575,140 A | 11/1996 | Bermes et al. | |
| 5,697,623 A | 12/1997 | Bermes et al. | |
| 5,813,679 A * | 9/1998 | Hobrath ..................... | 280/32.7 |
| 5,842,707 A * | 12/1998 | Smith ........................ | 280/32.7 |
| 5,909,887 A * | 6/1999 | Hobrath ..................... | 280/32.7 |
| 5,947,505 A | 9/1999 | Martin | |
| 6,062,582 A | 5/2000 | Martin | |
| 6,375,201 B2 | 4/2002 | Havener | |
| 6,485,036 B1 | 11/2002 | Bricko | |
| 6,488,291 B1 | 12/2002 | Bellis, Jr. | |
| 6,497,422 B1 | 12/2002 | Bellis, Jr. | |
| 6,637,760 B1 * | 10/2003 | Carman ...................... | 280/32.7 |
| 6,659,190 B2 | 12/2003 | Jessen | |
| 6,874,796 B2 * | 4/2005 | Mercurio ................... | 280/32.7 |
| 6,986,397 B2 * | 1/2006 | Mattson et al. .............. | 180/11 |
| 2001/0026055 A1 | 10/2001 | Havener | |
| 2002/0163148 A1 | 11/2002 | McDonough et al. | |
| 2002/0171212 A1 | 11/2002 | Bricko | |
| 2003/0156931 A1 | 8/2003 | Pfisterer | |
| 2003/0167744 A1 | 9/2003 | Quarles | |
| 2003/0201106 A1 | 10/2003 | Jessen | |
| 2004/0108686 A1 | 6/2004 | Mercurio | |
| 2004/0182899 A1 | 9/2004 | Deutchman | |

FOREIGN PATENT DOCUMENTS

EP 0 837 790 B 4/1999

* cited by examiner

*Primary Examiner*—J. A Shriver
(74) *Attorney, Agent, or Firm*—Quarles & Brady LLP; Gavin J. Milczarek-Desai

(57) ABSTRACT

A sulky that includes a platform having a top and a bottom, a connector disposed upon a front of the platform, at least three wheels disposed upon the bottom of the platform in a wheel arrangement such that the connector is zero-weight bearing, and a seat disposed upon the top of the platform. A hinged platform extension provides added stability.

7 Claims, 3 Drawing Sheets

SULKY FOR SELF-PROPELLED MACHINES

BACKGROUND OF THE INVENTION

1. Field of the Invention

This invention relates generally to apparatuses used in conjunction with self-propelled machines, and, more particularly, to sulky-like carts that attach to outdoor equipment such as landscaping machines.

2. Description of the Related Art

Devices for attachment to self-propelled machines, such as power lawn mowers, provide a means for allowing a user to ride along with the machine. Such devices have been in use for many years and are commonly referred to as a "sulky." A sulky typically includes a platform mounted between two wheels that is connected to the self-propelled machine by a tow bar.

For example, a sulky apparatus is illustrated in U.S. Pat. No. 5,004,251 to Velke that employs a platform covering a single wheel located between the foot plates for the operator's feet. The platform is pivotally connected to one end of the tow bar along a vertical axis, allowing free rotation of the platform horizontally. The other end of the tow bar is pivotally connected to the mower along a horizontal axis to allow the platform and tow bar to move up and down with respect to the mower. Furthermore, U.S. Patent Publication No. 2004/0108686 by Mercurio discloses a sulky that features a seat and a buck-bar. However, both the Velke and Mercurio references disclose either one or two wheel sulkies. Such wheel configurations can be unstable because substantial weight (including that of the rider) is inherently placed upon the structure that connects the sulky to the self-propelled machine. Thus, if the connection between the sulky and pulling machine undergoes stress (e.g., difficult topography) or fails outright, the rider is likely to topple as the sulky suddenly pitches toward the ground.

Moreover, none of the sulky apparatus typified by the above references addresses the problem of too much tipping of the sulky away from the plane of the mower, tipping that could result in the dislodgment of the operator or overturn of the entire sulky.

Therefore, there is a need for a sulky that provides a stable, easy-to-turn platform for a rider and that dampens or offsets forces that may lead to tipping of the platform.

SUMMARY OF THE INVENTION

In general, the invention provides a new and improved riding cart (i.e., sulky) that is attached to a self-propelled machine, such as a mower, in order to convert a "walk-behind" apparatus into a riding machine. In particular, the invention relates to a sulky that includes a platform having at least three wheels, a connector disposed upon the front of the platform that is adapted to engage a second connector on the self-propelled machine, and a seat.

The connector of the invention is zero-weight bearing or "floating." In other words, the wheels of the sulky are disposed in such a way that the weight of a rider and/or load is distributed among the wheels rather than on the connector. This provides a stability advantage over one and two wheeled sulkies.

Moreover, in one particularly preferred embodiment of the invention, the sulky includes a platform having a top and a bottom, a pair of wheels disposed upon an axle proximal to the front of the platform bottom, at least one wheel disposed proximal to the rear of the platform bottom, a platform extension hingedly mounted proximal to the platform front, a connector disposed upon the platform extension, and a seat. The platform extension further stabilizes the sulky when the self-propelled apparatus proceeds over, for example, rolling terrain, as the connector on the hinged extension follows the up-and-down motion of the apparatus without translating that motion to the sulky.

In another embodiment of the invention, the sulky further includes a pair of castors disposed on opposing sides proximal to the platform rear (i.e., at the end opposite to that of the connector) and in alignment with rear wheel or wheels.

A further embodiment of the invention provides a shock-absorbing means that is disposed upon a hinged platform extension to dampen shock between the platform extension and the platform. Preferably, the shock-absorbing means include a spring connecting the platform extension with the platform such that the hinged platform will tend to absorb some "bounce" that otherwise would be translated to the platform.

Various other purposes and advantages of the invention will become clear from its description in the specification that follows. Therefore, to the accomplishment of the objectives described above, this invention includes the features hereinafter fully described in the detailed description of the preferred embodiments, and particularly pointed out in the claims. However, such description discloses only some of the various ways in which the invention may be practiced.

DETAILED DESCRIPTION OF THE PREFERRED EMBODIMENTS

The invention generally relates to a sulky-type cart that provides stability to a rider of a self-propelled machine through a wheel arrangement that minimizes weight distribution on the cart/machine connection and that guards against overturning, as well as through the provision of a hinged platform extension and shock-adsorption means.

Figure 1:
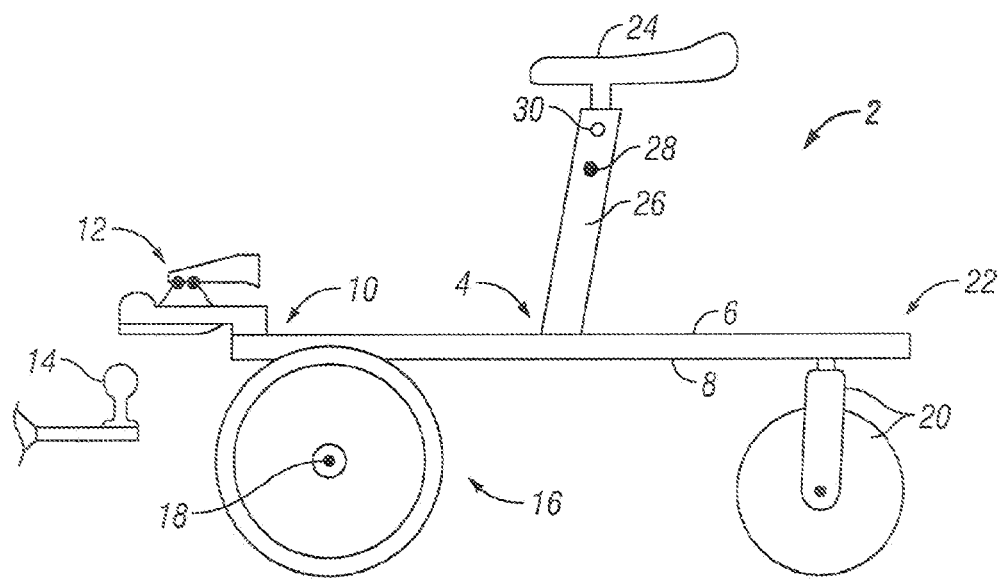
FIG. 1 is a side elevational view of a first embodiment of the invention.
Figure 2:
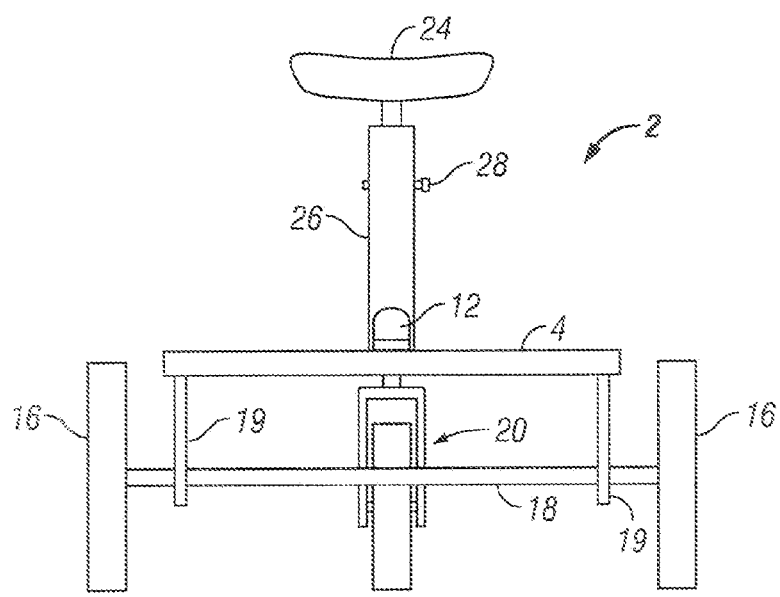
FIG. 2 is a front elevational view of the embodiment illustrated in FIG. 1.

Turning to the figures, wherein like number designate like elements, FIGS. 1 and 2 illustrate a first embodiment of the invention. The sulky 2 includes a platform 4 having a top 6 and a bottom 8. Disposed upon the front 10 of the platform 4 is a connector 12. The connector 12 is adapted to engage a second connector 14 on a self-propelled apparatus (as shown, for example, in FIG. 5). Of course, "front," "rear," "top," and "bottom" are relative terms and, as such, are illustrative and not meant to limit the location of an element to a single position on the platform.

At least three wheels are disposed upon the bottom 8 of the platform 4 in an arrangement such that said connector 12 is zero-weight bearing. Preferably, a pair of wheels 16 are disposed upon an axle 18 that is rotatably mounted on a pair of brackets 19 located proximal to the front 10 of platform 4, while a single caster 20 is centrally disposed proximal to the rear 22 of the platform. A seat 24 is attached to a post 26 on the top 6 of the platform 4 in order to accommodate a rider. The seat 24 may be adjusted in height by removing peg 28 and placing it in a different opening 30.

Figure 3:
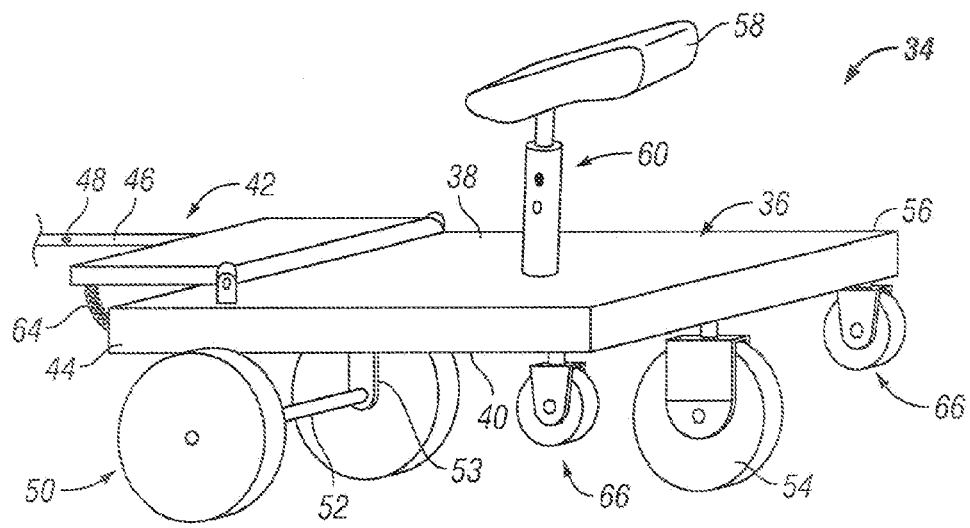
FIG. 3 is a perspective view of the preferred embodiment of the invention.
Figure 4:
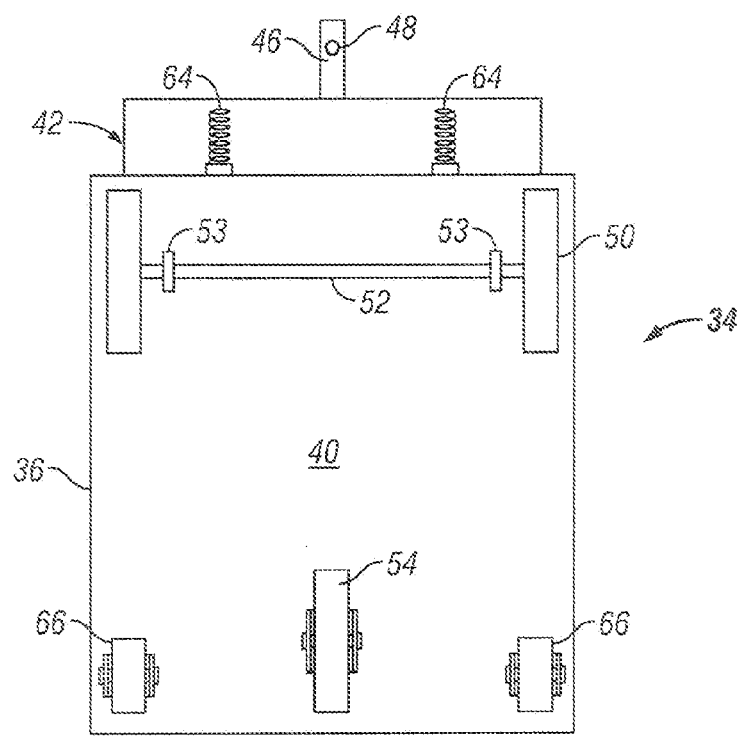
FIG. 4 is a bottom elevational view of the embodiment shown in FIG. 3.

As shown in perspective view in FIG. 3, a second embodiment of the invention features a sulky 34 that includes a platform 36 having a top 38, a bottom 40, and a platform extension 42 hingedly mounted at 43 proximal to the platform front 44. A connector 46 having an opening 48 (for receiving a lock pin) is attached to the platform extension 42 to engage a second connector on a self-propelled machine.

Three wheels are disposed upon the bottom of the platform in an arrangement such that said connector is zero-weight bearing. Thus, the wheel arrangement of this embodiment includes a pair of wheels 50 disposed upon an axle 52 rotatably mounted through brackets 53, which are attached proximal to the front 44 of the platform bottom 40, and one wheel 54 disposed proximal to the rear 56 of platform bottom 40. In this case, the one wheel 54 is a castor. However, other types of wheels may be used. A seat 58 is adjustably mounted on a post 60 on the top 38 of platform 36 from which a rider controls the self-propelled machine.

The sulky 34 further includes a shock-absorbing means disposed upon the platform extension 42 to dampen shock between the platform extension and platform 36. In this embodiment, the shock-absorbing means comprises a pair of springs 64 connecting the platform extension 42 with the platform. The combination of the hinged platform extension 42 and springs 64 also renders the connector 46 a "floating-type" connector in that uneven motion is not readily translated to the sulky, thereby providing added stability.

To guard against tipping over, the sulky 34 further includes a pair of castors 66 disposed on opposing sides of the platform 36 proximal to the platform rear 56. In this particular embodiment, the pair of castors 66 are shown to be shorter and smaller than the remaining wheels. Nonetheless, castors 66 may made to other sizes and lengths.

Figure 5:
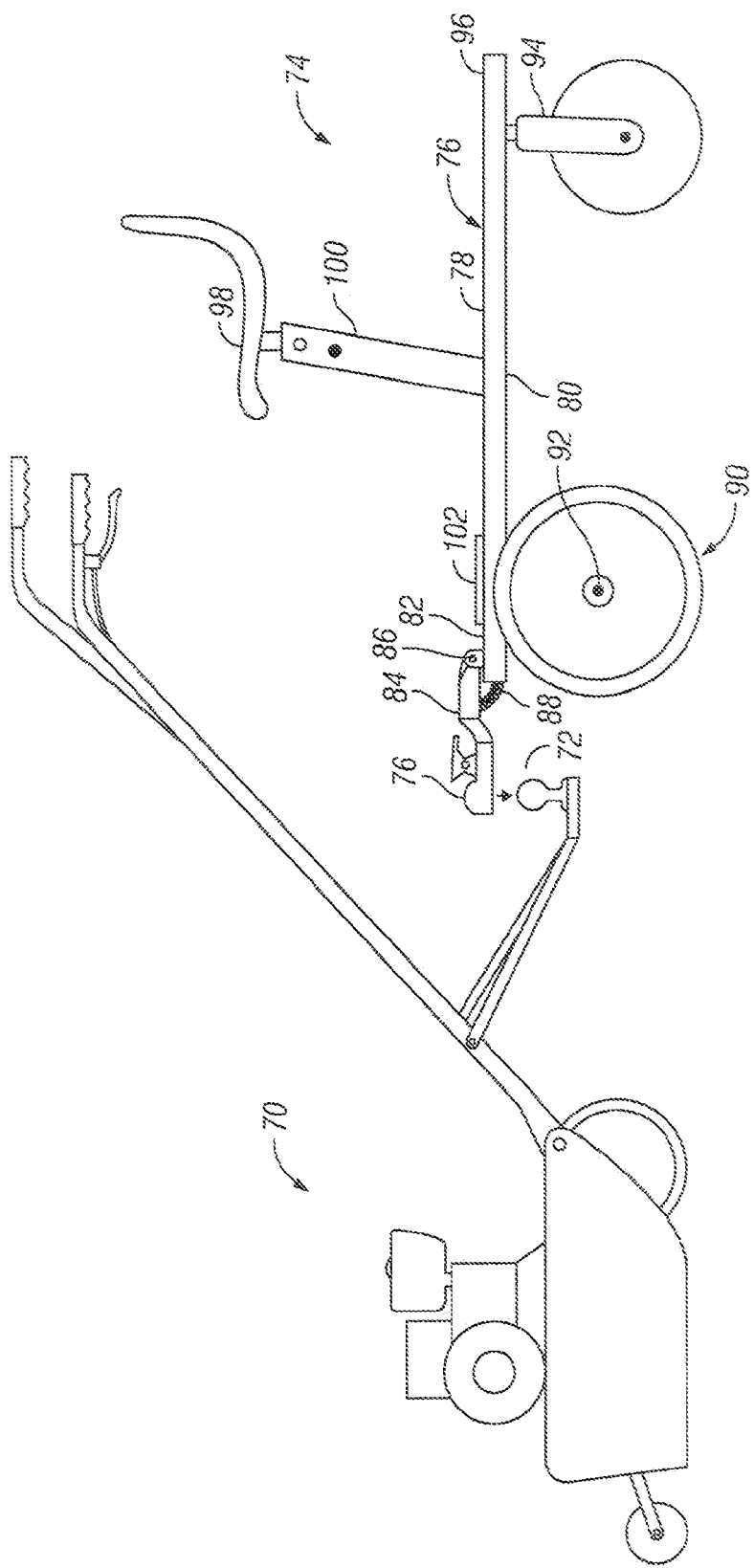
FIG. 5 is a side elevational view of a third embodiment of the invention.

Turning to FIG. 5, a combination self-propelled apparatus and sulky is illustrated. In this embodiment, the apparatus is a self-propelled landscaping machine 70 having a connecter ball 72 to which sulky 74 is coupled through its receiving connector 76.

The sulky 74 includes a platform 76 having a top 78 and a bottom 80 onto which the connector 76 is disposed proximal to the platform front 82 via platform extension 84. The platform extension 84 is mounted to the platform at hinges 86. Moreover, a shock-absorbing means (spring 88) is disposed upon the platform extension. Thus, in addition to dampening shock, the platform extension is made adjustable such that the connector 76 can be moved down upon ball 72 in the event that the height alignment between the ball and connector is skewed.

A pair of wheels 90 is disposed upon an axle 92 proximal to the front 82 of the platform bottom 80, while a single wheel 94 is disposed proximal to the rear 96 of the platform bottom 80 such that the connector 76 is zero-weight bearing. The sulky 74 comfortably accommodates a rider in the seat 98 mounted in post 100, while non-slip foot pad 102 provides a safe area for the rider to place her feet.

Various changes in the details and components that have been described may be made by those skilled in the art within the principles and scope of the invention herein described in the specification and defined in the appended claims. Therefore, while the present invention has been shown and described herein in what is believed to be the most practical and preferred embodiments, it is recognized that departures can be made therefrom within the scope of the invention, which is not to be limited to the details disclosed herein but is to be accorded the full scope of the claims so as to embrace any and all equivalent processes and products.

What is claimed is:

1. A sulky, comprising:
   a platform having a top and a bottom;
   a platform extension hingedly mounted proximal to said platform front;
   a connector disposed upon said platform extension, said connector being adapted to engage a second connector on a self-propelled apparatus;
   at least three wheels disposed upon the bottom of the platform in an arrangement such that said connector is zero-weight bearing; and
   a seat disposed upon said top of said platform.

2. The sulky of claim 1, wherein a shock-absorbing means is disposed upon said platform extension to dampen shock between said platform extension and said platform.

3. The sulky of claim 2, wherein said shock-absorbing means comprises a spring connecting said platform extension with said platform.

4. The sulky of claim 1, wherein said wheel arrangement comprises a pair of wheels disposed upon an axle proximal to the front of said platform bottom and at least one wheel disposed proximal to a rear of said platform bottom.

5. The sulky of claim 4, wherein said at least one wheel comprises a castor.

6. The sulky of claim 5, wherein said platform further includes a pair of castors disposed on opposing sides proximal to said platform rear.

7. The sulky of claim 2, wherein said seat is adjustably mounted on a post disposed on the top of said platform.

* * * * *